United States Patent [19]

Moores, Jr. et al.

[11] 3,845,336

[45] Oct. 29, 1974

[54] BEARING AND HOUSING CONSTRUCTION

[75] Inventors: Robert G. Moores, Jr., Cockeysville; Leo A. McCafferty, Jr., Baltimore; Leonard U. Alsruhe, Towson, all of Md.

[73] Assignee: The Black and Decker Manufacturing Company, Towson, Md.

[22] Filed: Oct. 1, 1970

[21] Appl. No.: 77,113

[52] U.S. Cl.................... 310/52, 308/77, 310/50
[51] Int. Cl. ............................................ H02k 9/00
[58] Field of Search .......... 310/58, 59, 62, 63, 227, 310/50, 89, 90, 64, 52; 308/77

[56] References Cited
UNITED STATES PATENTS

| 531,748 | 1/1895 | Raymond | 308/77 |
|---|---|---|---|
| 2,174,854 | 10/1939 | Corwin | 308/77 |
| 2,545,335 | 3/1951 | Becker | 310/52 |
| 3,177,731 | 4/1965 | Peterson | 308/77 X |
| 3,252,020 | 5/1966 | Consoli | 310/90 X |

Primary Examiner—Richard B. Wilkinson
Assistant Examiner—U. Weldon
Attorney, Agent, or Firm—Joseph R. Slotnik; Leonard Bloom; Edward D. Murphy

[57] ABSTRACT

A portable electric device comprising a housing having an electric motor disposed therein. The motor includes a rotatable shaft carried by bearings supported upon the housing. The housing includes a portion supporting at least one of the bearings and formed from an electrically insulating material, which also has low thermal conductivity. In order to insure adequate cooling of this bearing, this housing portion is constructed to facilitate the passage of cooling air around and past the one bearing during operation of the motor.

9 Claims, 5 Drawing Figures

PATENTED OCT 29 1974
3,845,336
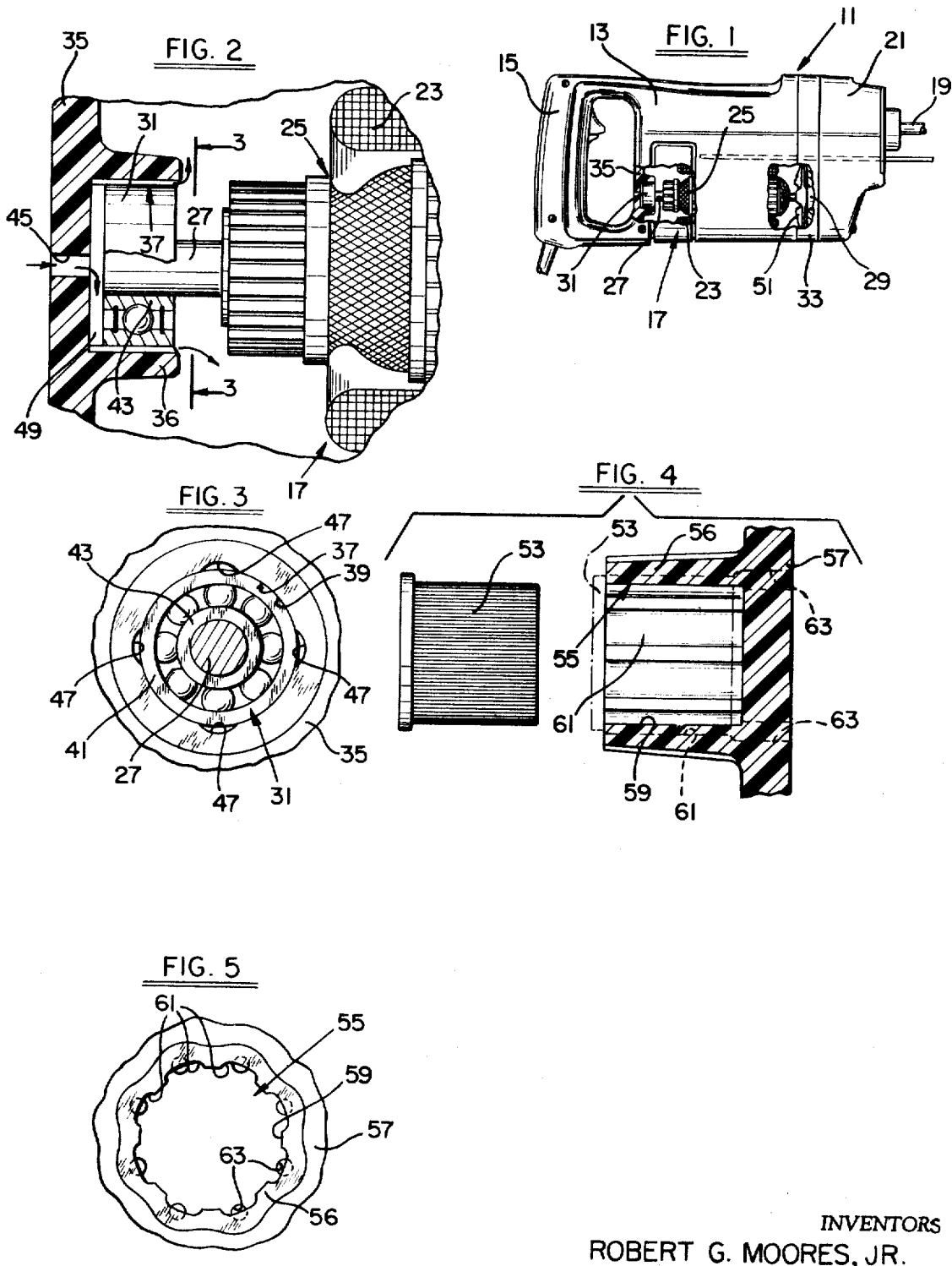
INVENTORS
ROBERT G. MOORES, JR.
LEO A. McCAFFERTY, JR.
LEONARD U. ALSRUHE
BY Joseph R. Slotnik
ATTORNEY

BEARING AND HOUSING CONSTRUCTION

SUMMARY OF THE INVENTION

The present invention is directed to a novel construction which facilitates efficient cooling of a bearing supported directly within an opening in a housing constructed of electrically insulating material also having low thermal conductivity. The bearing is supported within a pocket or recess having slots or interruptions formed in the surface thereof to allow cooling air to flow past the exterior surface of the bearing. This construction is particularly advantageous in double-insulated electric tools and allows the bearing to be supported directly within an insulating housing while eliminating the need for additional heat dissipating parts.

Main objects, therefore, of the present invention are to provide a novel bearing support which facilitates direct support of a bearing within a housing constructed of electrically insulating, low thermal conductivity material, and wherein the bearing is efficiently cooled without the need for additional parts for heat dissipation, and the danger of thermal failure of the bearing support is eliminated.

Additional important objects of the present invention are to provide a bearing support construction of the above character, in which conventional bearings may be utilized with no modifications or alterations required.

Further important objects of the present invention are to provide a novel bearing support construction of the above character which is relatively inexpensive to manufacture, rugged in construction, and reliable in use.

Other important objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view, partly broken away and in section, illustrating a portable electric tool embodying the present invention;

FIG. 2 is an enlarged view of a portion of the construction of FIG. 1 and showing a preferred form of the present invention;

FIG. 3 is a sectional view of the construction of FIG. 2 taken along the line 3—3 thereof;

FIG. 4 is an exploded sectional view illustrating a modified form of the present invention;

FIG. 5 is an end view of the bearing support shown in FIG. 4.

BROAD STATEMENT OF THE INVENTION

Broadly described the present invention relates to an electric motor which comprises a housing including a member constructed of electrically insulating, low thermal conductivity material, a stationary field supported within said housing, a rotatable armature supported within said field and including an armature shaft, a fan driven by said motor and adapted to draw cooling air through said motor, a bearing rotatably supporting said armature shaft, said housing member having a recess defined by a generally annular surface having arcuately spaced slots therein, said bearing being snugly receivable within said recess and adapted to engage said annular surface, said slot extending the entire axial length of said bearing and communicating with said fan, opening means in said housing member communicating the atmosphere with said slots, whereby said cooling air is drawn through said opening means and said slots and over said bearing.

In another aspect, the present invention relates to a bearing assembly comprising a rigid member constructed from an electrically insulating material having relatively low thermal conductivity, a blind bore in said member, said bore having a generally annular surface with axially extending, arcuately spaced slots therein, at least one opening in the end wall of said member communicating with said slots, a bearing received within said bore and snugly engaging said annular surface, said slots extending the entire axial length of said bearing, whereby cooling air may pass through said opening means and said slots to cool said bearing.

DETAILED DESCRIPTION

Referring now more specifically to the drawings, a portable electric rotary hammer embodying the present invention is illustrated generally at 11 in FIG. 1 and is seen to include a motor housing 13 having an end handle 15 rigid therewith. An electric motor 17 is disposed within the housing 13 and is adapted to rotate and impart a longitudinal reciprocating blow to a tool bit 19 supported upon a gear housing 21. A transmission (not shown) is located within the gear housing 21 and the motor housing 13 for transmitting this rotation and longitudinal impact movement to the bit 19.

The motor 17 includes a stationary field 23 fixed within the motor housing 13. A rotatable armature 25 is located within the field 23 and includes an armature shaft 27 supported fore and aft by bearings 29, 31. The bearings 29, 31 are carried by a gear housing cover 33 and a wall 35 of the motor housing 13, respectively.

In some electric devices, it is desirable to form one or more of the supporting structural components from an electrically insulating material. For example, the tool 11 is double-insulated and, to that end, the housing is formed from a non-conductive (electrically insulating) material. Of the nonconductive materials, both the thermoplastic and thermosetting resins are suitable, although the thermoplastics are preferable because of ease of manufacture. Some examples of thermoplastics are polycarbonate, ABS and nylon, either plain or glass reinforced. In addition to be electrically insulating, however, these materials also include the property of low thermal conductivity. Thus, when using these in an electric power tool, it has frequently been necessary to utilize additional heat dissipating means to insure that a bearing supported therein would run sufficiently cool and that the plastic material adjacent to this bearing is not heated to the melting point.

In accordance with present invention, the housing 13, including the bearing support portion 36 is constructed to facilitate efficient cooling of the bearing 31 or 53 supported therein so that no additional heat dissipating means is required.

Turning now to FIGS. 2 and 3, the end wall 35 of the housing 13 includes a boss 36 having recess 37 defined by a generally annular wall 39. The illustrated bearing 31 is a ball-type having an outer race 41 snugly fitted in engagement with the annular surface 39, and an inner race 43 closely receiving the shaft 27. The end wall 35 also includes at least one opening 45 which communicates with the recess 37. In addition, a plurality of axially extending, arcuately spaced slots 47 are formed in the annular surface 39 and communicate with the opening 45 by means of clearance 49 between the end of the bearing 31 and the bottom of the recess 37.

The motor 17 also includes a fan 51 fixed on the armature shaft 27 and functioning to draw cooling air through the motor 17 between the field 23 and the armature 25 during operating of the tool 11. In the present construction, the fan 51 draws this motor cooling air from outside the motor housing 13 and causes part of it to flow in through the opening 45, into the clearance space 49, and along the outer surface of the bearing 31, by way of the slots 47. This flow of air is illustrated by the arrows in FIG. 2. From this point, the motor cooling air flows into the left-hand side of the motor 17, between the armature 25 and field 23, and out the rear of the gear case cover 33.

Thus, it will be seen that even though the bearing 31 is entirely supported directly within the electrically insulating material forming the end wall 35 for the motor housing 13, the bearing 31 is adequately cooled by means of the air drawn therepast through the slots 47. No additional structure is needed, therefore, to provide for heat dissipation and cool operation of the bearing 31 and the adjacent boss 36 and end wall 35 of housing 13. This results in a considerable reduction in the complexity, cost and weight of this particular construction.

FIGS. 4 and 5 illustrate a modified version of the present invention. In this construction, a sleeve-type bearing 53 is substituted for the ball bearing 31 and is seen adapted to fit snugly within a blind bore 55 formed in a boss 56 on the housing end wall 57. The bore 55 includes a generally cylindrical surface 59 interrupted by axially extending, arcuately spaced slots or recesses 61. The bearing 53 substantially bottoms within the bore 55, as shown in FIG. 4. However, a plurality of apertures 63 are formed in the end wall 57 and communicate with the slots 61. Thus, during operation of the motor, the motor cooling fan draws air from outside the end wall 57, through apertures 63, along the outer surface of the bearing 53 by way of slots 59. Thus, in a manner similar to the embodiment of FIGS. 1-3, the bearing 53 (and the boss 56 and end wall 57) of the embodiment of FIGS. 4 and 5 are adequately cooled during operation of the motor without the need for additional heat dissipating construction. In all other respects, the embodiment of FIGS. 4 and 5 is substantially the same as the embodiment of FIGS. 1-3.

By the foregoing, there has been disclosed a novel bearing support construction calculated to fulfill the inventive objects set forth herein above, and while preferred embodiments of the present invention have been illustrated and described in detail, various additions, substitutions, modifications, and omissions may be made thereto without departing from the spirit of the invention as encompassed by the appended claims.

1. An electric motor comprising a housing including a member constructed of electrically insulating, low thermal conductivity material, a stationary field supported within said housing, a rotatable armature supported within said field and including an armature shaft, a fan driven by said motor and adapted to draw cooling air through said motor, a bearing rotatably supporting said armature shaft, said housing member having a recess defined by a generally annular surface having arcuately spaced slots therein, said bearing being snugly receivable within said recess and adapted to engage said annular surface, said slots extending the entire axial length of said bearing and communicating with said fan, opening means of said housing member communicating the atmosphere with said slots, whereby said cooling air is drawn through said opening means and said slots and over said bearing.

2. A motor as defined in claim 1 wherein said housing member encloses and supports said motor field, said fan being fixed to said shaft.

3. A motor as defined in claim 1 wherein said housing member is constructed from a thermoplastic material.

4. A motor as defined in claim 1 wherein said slots extend substantially the entire axial length of said recess, said opening means including at least one opening in said member communicated with said recess.

5. A motor as defined in claim 4 wherein said bearing is spaced from the bottom of said recess and defines therewith a clearance space communicating said opening and said slots.

6. A motor as defined in claim 4 wherein said bearing extends substantially the entire axial length of said recess, said opening means including an opening communicated with each recess.

7. A bearing assembly comprising a rigid member constructed from an electrically insulating material having relatively low thermal conductivity, a blind bore in said member, said bore having a generally annular surface with axially extending, arcuately spaced slots therein, at least one opening in the end wall of said member communicating with said slots, a bearing received within said bore and snugly engaging said annular surface, said slots extending the entire axial length of said bearing, whereby cooling air may pass through said opening means and said slots to cool said bearing.

8. A bearing support as defined in claim 7 which includes a plurality of openings in said end wall, each of which communicates with a corresponding one of said slots.

9. A bearing support as defined in claim 7 wherein said support is constructed of thermoplastic material.

* * * * *